Dec. 22, 1931.  W. E. BOCK  1,837,520
SLIP CLUTCH
Original Filed Feb. 23, 1926    3 Sheets-Sheet 1

Inventor
William E. Bock
Whittemore
Hulbert Whittemore
& Belknap
Attorneys

Dec. 22, 1931.  W. E. BOCK  1,837,520
SLIP CLUTCH
Original Filed Feb. 23, 1926   3 Sheets-Sheet 2

Inventor
William E. Bock
By Whittemore Hulbert Whittemore
& Belknap   Attorneys

Dec. 22, 1931.   W. E. BOCK   1,837,520
SLIP CLUTCH
Original Filed Feb. 23, 1926   3 Sheets-Sheet 3

Inventor
William E. Bock

Patented Dec. 22, 1931

1,837,520

UNITED STATES PATENT OFFICE

WILLIAM E. BOCK, OF TOLEDO, OHIO, ASSIGNOR, BY MESNE ASSIGNMENTS, TO THE BOCK LAUNDRY MACHINE COMPANY, OF TOLEDO, OHIO, A CORPORATION OF OHIO

SLIP CLUTCH

Application filed February 23, 1926, Serial No. 90,198. Renewed May 6, 1931.

The invention relates to friction clutches and has for its main object the obtaining of a construction which avoids overloading of the motor or other driving mechanism. To this end the invention consists first, in the means through which the transmitted torque is limited to avoid objectionable slowing of the driver; second, in the means for automatically unloading when the speed of the driver falls below a predetermined limit; third, in the means for avoiding wear of the clutch surfaces. The invention further consists in various specific features as hereinafter set forth.

Figure 1:
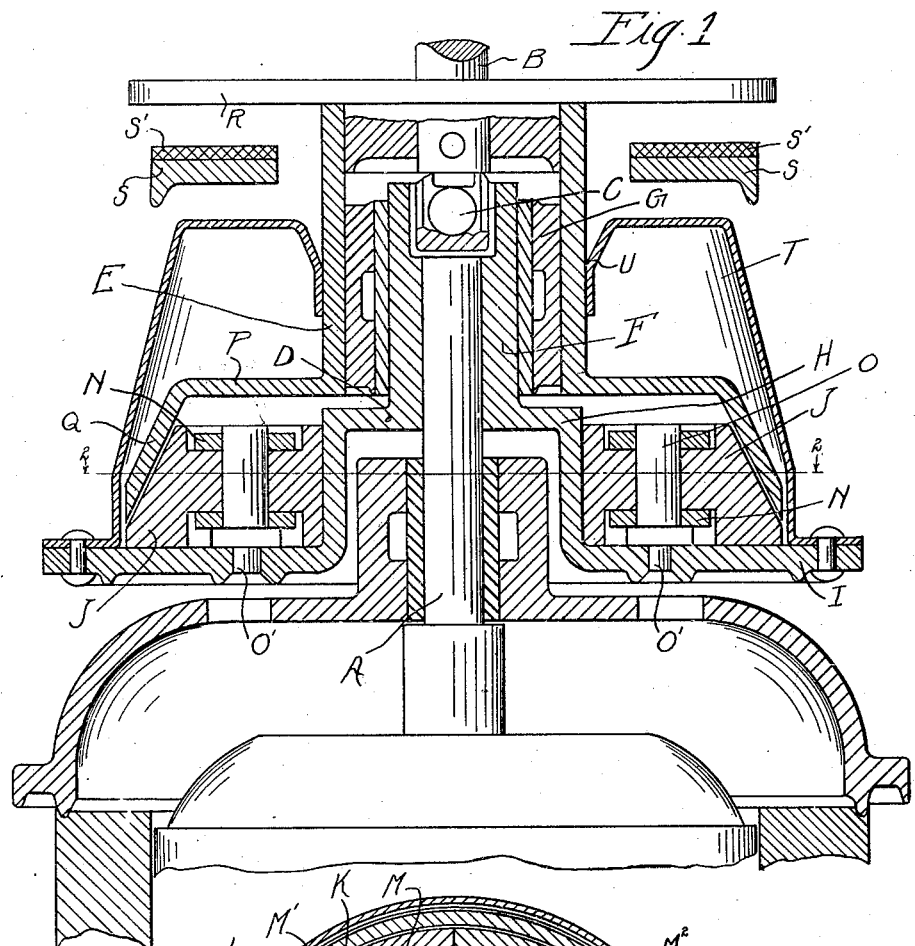
Figure 1 is a central longitudinal section through one embodiment of my improved clutch.
Figure 2:
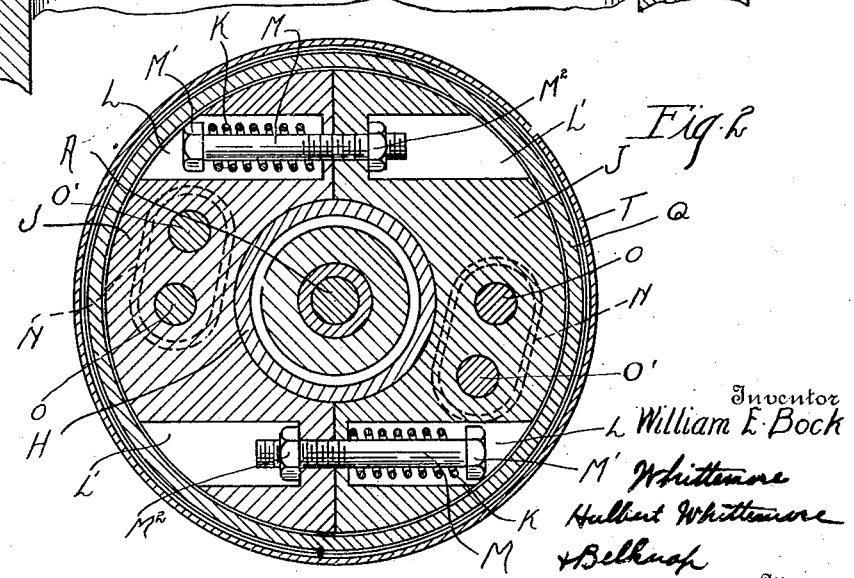
Figure 2 is a cross section on line 2—2 of Figure 1.
Figure 3:
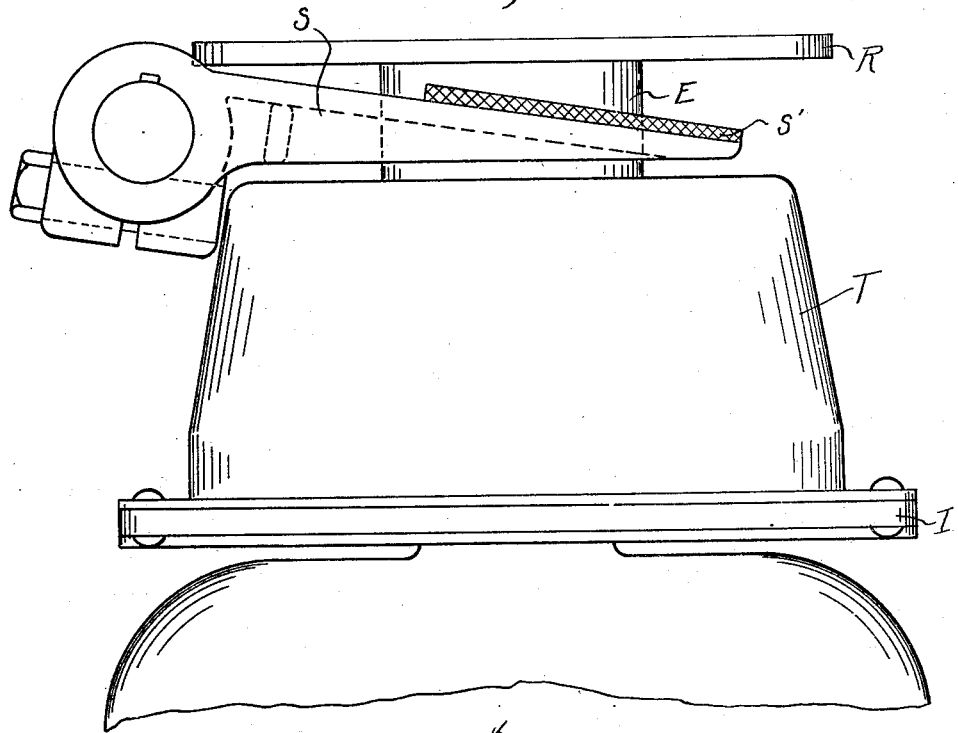
Figure 3 is an elevation at right angles to Figure 1.
Figure 4:
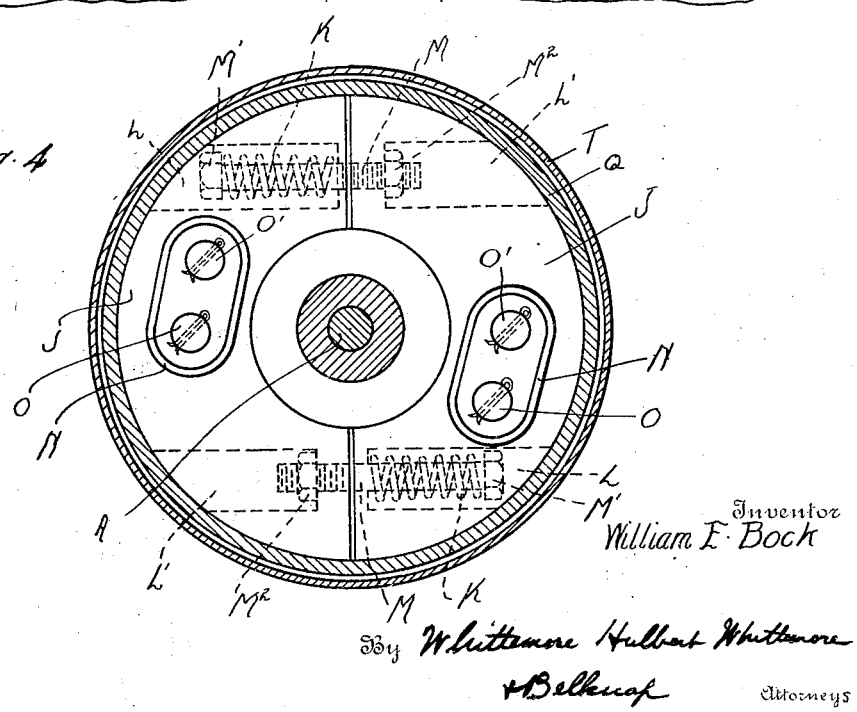
Figure 4 is a figure similar to Figure 2 showing the clutch in fully engaged position.

In the operation of machines driven by small powered electric motors there is danger of overloading in starting. To avoid this it is usually necessary to provide either a special construction of motor or some means of control through which the current volume is limited until the inertia of the driven mass is overcome. The slip clutch forming the subject matter of this application avoids such complications by limiting the transmitted torque so that with a simple ordinary construction of motor there is no danger of overloading.

Essentially my improved construction comprises a driving and a driven member provided with cooperating friction surfaces which when in static condition or when rotating at less than a predetermined speed are spaced from each other with a film of lubricating fluid therebetween.

There is also provided centrifugally operated means for pressing these surfaces against each other whenever the speed of rotation is above such limit. Thus, by placing this limit somewhat lower than the normal speed of operation the load may be gradually picked up without objectionable slowing of the motor.

As specifically shown the clutch is designed for transmitting torque between a motor having its armature shaft extending vertically and an axially aligned driven shaft. In this specific construction A is a motor shaft and B the driven shaft in axial alignment therewith with a ball thrust bearing C arranged between the same. D is the driving clutch member which is mounted on the shaft A and E is the driven clutch member connected with the shaft B and axially movable with respect to the member D. In detail the member D has a hub portion F recessed at its upper end to receive the ball thrust bearing C and surrounded by a bushing G on which the member E is slidably mounted. The member D is further provided with an enlarged hub portion H with a radially extending flange or disk I at the lower end thereof. On this disk and surrounding the portion H are segmental friction shoes J, preferably two arranged respectively on opposite sides of the axis of the shaft and normally abutting against each other. These shoes are yieldably held from separation by springs K located in recesses L and surrounding the guide pins or bolts M. One end of each bolt M is provided with a head M′ forming an abutment for the spring while the opposite end portion is adjustably connected to the opposite shoe by means of a nut M² engaging a threaded portion of the pin. This nut is located in a recess L′ and forms a means by which the tension of the spring may be varied. The shoes J are also provided with a torque connection to the disk I which permits of free radial movement within limits. This as shown comprises pairs of links N arranged in recesses in the shoes between the recesses L and L′ and extending substantially at right angles to the direction of the pins M. One end of each pair of links is pivotally connected at O to the shoe and the other end is connected to the pivot O′ attached to the disk I sufficient clearance being provided for the outward movement of the shoes without interference with these pins.

The member E has an outwardly extending flanged portion P terminating in a depending annular flange Q which latter peripherally surrounds the shoes J and is in close proximity thereto. The adjacent faces of the shoes J and flange Q are preferably slightly coned and in position where the shaft B is in contact with the thrust bearing C, there is only a slight clearance between these faces. R is a radially extending flange on the upper end of the member E beneath which is arranged a forked rock arm S for engaging the said flange and raising the member E. The rock arm S is preferably provided with brake facings S' which assist in arresting rotary movement of said member in raised position. T is a housing surrounding the members J and E being preferably secured to the marginal portion of the disk I and extending upward and inward into proximity to the member E. This housing contains a quantity of lubricating fluid, and an inwardly extending flange U on the housing prevents the escape of such fluid between the same and the member E.

With the construction as described the springs K are so tensioned that at a rotary speed somewhat less than the normal operating speed of the drive shaft centrifugal force will overcome this tension and spread the shoes. On the other hand, for all speeds under this limit the shoes will be held in contact with each other and with the hub portion H so as to peripherally clear the flange Q. Assuming that the member E is in raised position and that the motor shaft is revolving at normal speed, the shoes J will be moved outward centrifugally but will not come into contact with the flange Q, therefore there will be no transmission of movement from the shaft A to the shaft B. To throw in the clutch the operator lowers the forked arm S permitting the shaft B and member E to fall until arrested by the thrust bearing C. This will bring the shoes into frictional contact with the flange Q but with the film of the lubricating fluid therebetween. The inertia of the load will at once check the speed of the shaft A but as soon as this drops below the limit at which the springs K are set, the shoes will be drawn inward relieving the friction and correspondingly diminishing the torque transmission. This in turn will unload the motor so that a balance is established in which the motor will rotate at the highest speed and the torque transmission is as great as possible without overloading. This will continue until the shaft B is gradually accelerated to a speed approximating that of the driving shaft A after which the latter will increase in speed with a corresponding increase in friction between the shoes and the flange Q. Finally, when full speed is attained the friction is sufficient to prevent any slippage.

While I have described one specific embodiment of my invention, it is obvious that the novel principle involved may be applied to various constructions. It is also obvious that there is no danger of premature seizing of the clutch members for any tendency toward this will overload and slow the driver bringing about a separation of the shoes from the flange Q. This also insures the constant presence of a film of lubricant between the shoes and the flange Q as long as there is any differential speed.

Figure 5:
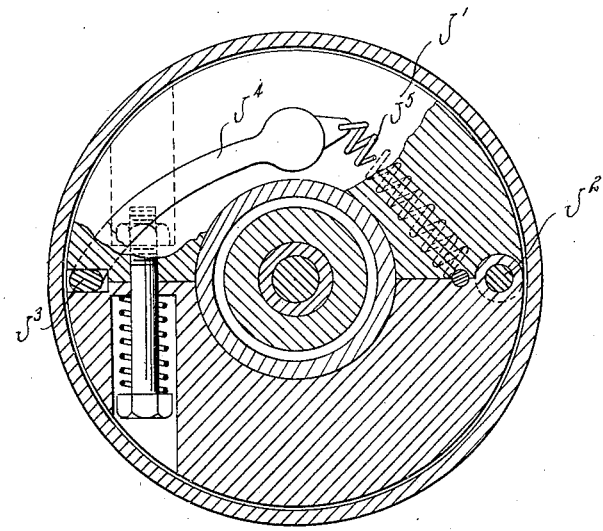
Figure 5 is a diagrammatic elevation showing a modified construction.

In Figure 5 a modification is shown in which the centrifugal force for pressing the friction shoes against the cooperating friction surface is indirectly applied. Thus, as shown, the shoes J' are hinged to each other at J² and upon the diametrically opposite side there is arranged a cam J³ for spreading the shoes, this being actuated by a weighted arm J⁴. The shoes are normally drawn towards each other by a spring but when a predetermined speed is attained the weighted arm J⁴ actuating the cam J³ will spread the shoes and increase the friction thereof. The cam may be designed for any desired increase of leverage and may also be either within or without the angle of friction. Thus, where the cam is within the angle of friction the action is irreversible so that the shoes become in effect a rigid member and capable of transmitting any amount of torque to the flange Q. If, however, the driver is overloaded and its speed retarded, a spring J⁵ operating to retract the arm J⁴ will rotate the cam and relieve the friction.

The construction just described will be particularly useful under conditions where it is desirable to supply a relatively great initial torque while at the same time guarding against retarding the driver below a predetermined limit of speed. It is obvious that instead of making this mechanism irreversible it may be either semi-irreversible or merely a predetermined increase in pressure due to increased leverage.

What I claim as my invention is:

1. The combination with a rotary driving and a rotary driven member, of cooperating friction surfaces for transmitting torque from the one to the other, means cooperating with said driving member for supplying a lubricating fluid under centrifugally developed pressure to maintain a film between said surfaces and means operating during the acceleration of the driven member for limiting the pressure on said film and the torque transmission therethrough to that within the power of the driver when revolving at less than normal speed without overloading or retarding the same below a predetermined speed.

2. The combination with a rotary driving and a rotary driven member, of cooperating friction surfaces for transmitting torque from the one to the other, means cooperating with said driving member for supplying lubricating fluid under centrifugally developed pressure to form and maintain a film of lubricant between said surfaces while relatively moving, centrifugal means on said driver for controlling the pressure upon said lubricant film and the torque transmission therethrough to such as is within the power of the driver when revolving at less than normal speed without overloading or retarding the same beyond a predetermined limit.

3. The combination with a rotary driving and a rotary driven member, of cooperating friction members for transmitting torque from the one to the other, means cooperating with said driving member for supplying a lubricating fluid under centrifugally developed pressure to form and maintain a film between said members while relatively moving, centrifugally operated means carried by said driving member for increasing the pressure on said lubricant film and means for applying a counteracting force such as to limit the pressure on said film and the torque transmission pressure to that within the power of the driver when revolving at less than normal speed without overloading or retarding the same below a predetermined limit.

4. The combination with a rotary driving and a rotary driven member, of cooperating friction members for transmitting torque from the one to the other, means cooperating with said driving member for supplying a lubricating fluid under centrifugally developed pressure to form and maintain a film between said members while relatively moving, centrifugally operated means carried by said driving member for increasing the pressure on said lubricant film, means for applying a counteracting force to limit the pressure on said film and the torque transmission to that within the power of the driver when revolving at less than normal speed without overloading or retarding the same while below a predetermined limit of speed, said means permitting the transmission of a greater torque when above said limit.

5. The combination with a rotary driving and a rotary driven member, of an annular oil containing housing connected with one of said members, cooperating friction elements for transmitting torque from said driving to said driven member located in said housing and immersed in the oil contained therein and means operating when said driving member is retarded beyond a predetermined point less than the normal operating speed thereof and before overloading occurs for separating said cooperating friction members to relubricate the friction surfaces thereof.

6. The combination with a rotary driving and a rotary driven member, of a housing mounted on said driving member for holding lubricant, cooperating friction members for transmitting torque from said driving to said driven member located in said housing and positioned to be subject to the centrifugally developed pressure on the lubricant, and means operating when said driving member is retarded beyond a predetermined point less than the normal operating speed thereof and before overloading occurs for separating said cooperating friction members to permit the lubricant to be forced between the adjacent friction faces.

In testimony whereof I affix my signature.
WILLIAM E. BOCK.